US009208046B2

(12) United States Patent
Pasala et al.

(10) Patent No.: US 9,208,046 B2
(45) Date of Patent: Dec. 8, 2015

(54) METHOD AND SYSTEM FOR OPTIMIZING TESTING EFFORTS IN SYSTEM OF SYSTEMS TESTING

(71) Applicant: Infosys Limited, Bangalore (IN)

(72) Inventors: Anjaneyulu Pasala, Bangalore (IN); Padmalochan Bera, Dist-Purba-Medinipur (IN)

(73) Assignee: Infosys Limited, Bangalore (IN)

( * ) Notice: Subject to any disclaimer, the term of this patent is extended or adjusted under 35 U.S.C. 154(b) by 122 days.

(21) Appl. No.: 14/094,528

(22) Filed: Dec. 2, 2013

(65) Prior Publication Data

US 2015/0154094 A1  Jun. 4, 2015

(51) Int. Cl.
*G06F 11/00*   (2006.01)
*G06F 11/263*  (2006.01)
*G06F 11/26*   (2006.01)

(52) U.S. Cl.
CPC .............. *G06F 11/263* (2013.01); *G06F 11/26* (2013.01)

(58) Field of Classification Search
CPC ............................... G06F 11/26; G06F 11/263
See application file for complete search history.

(56) References Cited

U.S. PATENT DOCUMENTS

| | | | | |
|---|---|---|---|---|
| 7,860,700 | B2 * | 12/2010 | Behm et al. | 703/14 |
| 7,996,818 | B1 * | 8/2011 | Venugopal | 717/124 |
| 8,489,648 | B1 | 7/2013 | Rubin | |
| 9,026,394 | B2 * | 5/2015 | Kube et al. | 702/123 |
| 2015/0112906 | A1 * | 4/2015 | Gauthier et al. | 706/13 |

OTHER PUBLICATIONS

Bera P. et al., "A Framework for Optimizing Effort in Testing a System of Systems", Service in Emerging Markets (ICSEM), 2012 IEEE Third International Conference on Dec. 12-15, 2012, pp. 136-141.

* cited by examiner

*Primary Examiner* — Joshua P Lottich
(74) *Attorney, Agent, or Firm* — LeClairRyan, a Professional Corporation

(57) ABSTRACT

A method and system for optimizing the testing efforts in system of systems testing includes receiving test parameters for a new constituent system in a system of systems. Based on the received test parameters, retrieving, historical test knowledge related to the system of systems. Based on the retrieved historical test knowledge, characterizing unique parameters from the received test parameters. The unique test parameters are combined in sequence or in parallel to identify executable test parameters and one or more test cases are selected corresponding to the identified executable test parameters for execution.

20 Claims, 4 Drawing Sheets

METHOD AND SYSTEM FOR OPTIMIZING TESTING EFFORTS IN SYSTEM OF SYSTEMS TESTING

FIELD

The invention generally relates to system of systems testing, and more particularly, to a method and system for optimizing testing efforts in system of systems testing.

BACKGROUND

Generally, due to increasing complexity and heterogeneity of service level requirements from clients, software systems are becoming highly distributive. The increasing demand of clients on software system as "composable service provider in a box" requires significant cohesiveness between multiple independent systems to provide appropriate functional services to the desk in time. This leads to development of system-of-systems which in one hand is capable of providing operational independence of the distributed constituent systems and on other hand offers more service functionalities and performance through interactions with constituent systems.

Existing techniques in the area of system of systems testing is mostly focused on testing individual systems and instances of product line systems by reusing requirement specific test cases. However, none of these techniques describe the testing artifacts for system of systems. Other existing technique prescribes most effective strategies for test scheduling and resource allocation in system of systems integration. However, these techniques fail to describe how to optimize the test effort by characterizing test and reusing the previous test knowledge. In addition, this technique does not consider the interactions between different constituent systems and adoption of tests with new constituent system being plugged into the system of systems. Also the validation of system of systems is effort intensive because of the complexity and heterogeneity in terms of number of types of interactions to be validated between multiple constituent systems. Existing techniques of validating software units and integrated software systems are not capable of validating such large scale and heterogeneous system interactions with satisfying service level functionalities in a box. In addition, the above mentioned techniques does not evaluate the time-asynchronous integration of elements deployed in the system depending on changes in scenario and operating environment.

Hence, there is a need of a method and system for optimizing testing efforts in system of systems testing to address the aforementioned issues.

SUMMARY

An object of the invention is to provide a method and system for optimizing testing efforts in system of systems testing. This reduces the required test effort and associated cost for testing a system of systems.

Another object of the invention is to focus mainly on testing the interactions between system of systems and its constituent systems which are either existent or being plugged in to the system. This is achieved by the invention by intelligent test characterization.

As described herein, a variety of other features and advantages can be into the technologies as desired.

The foregoing and other features and advantages will become more apparent to one skilled in the art from the following detailed description of disclosed embodiments, which proceeds with reference to the accompanying drawings.

BRIEF DESCRIPTION OF DRAWINGS

The accompanying drawings, which constitute a part of this disclosure, illustrate various embodiments and aspects of present invention and together with the description, explain the principle of the invention.

DETAILED DESCRIPTION

Example 1

Exemplary Overview

The technologies described herein can be used for optimizing the testing efforts in system of systems and its constituent systems which are either existent or being plugged in to the system. Adoption of the technologies can provide an efficient technique for reducing test effort and associated cost required in system of systems testing.

The technologies are targeted to test analysts testing system of systems, who will appreciate the design approach. However the development team can also benefit from the technology as they might get more time to fix the reported bugs due to decrease in time taken by test analysts for testing. And, clients greatly benefit from the technologies because they enjoy accurate and credible delivery of services to their specific business needs and reach market faster as it reduces testing effort.

Example 2

Figure 1:
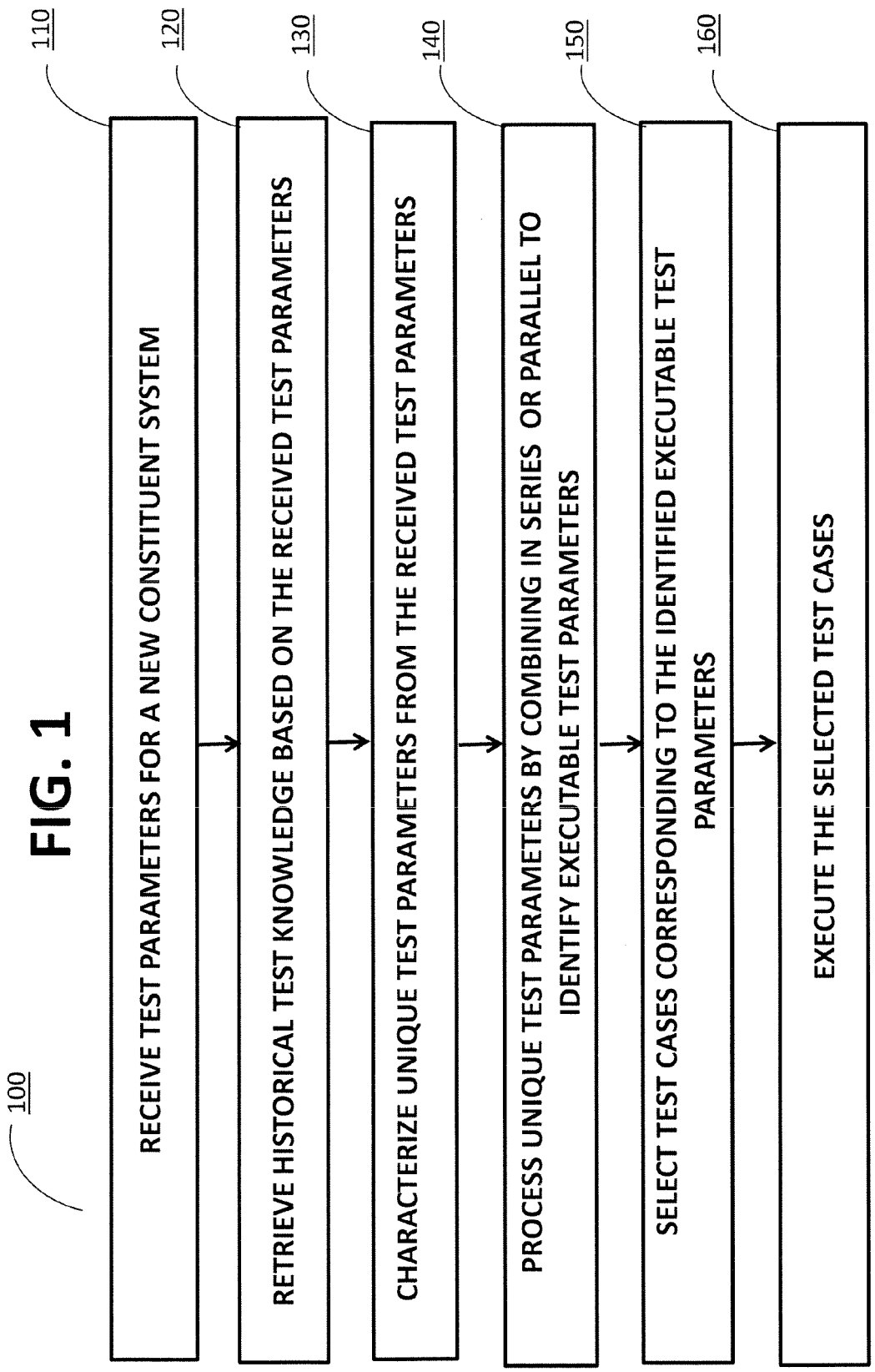
FIG. 1 is a flowchart representing steps involved in an exemplary method for optimizing testing efforts in system of systems testing described herein.
Figure 2:
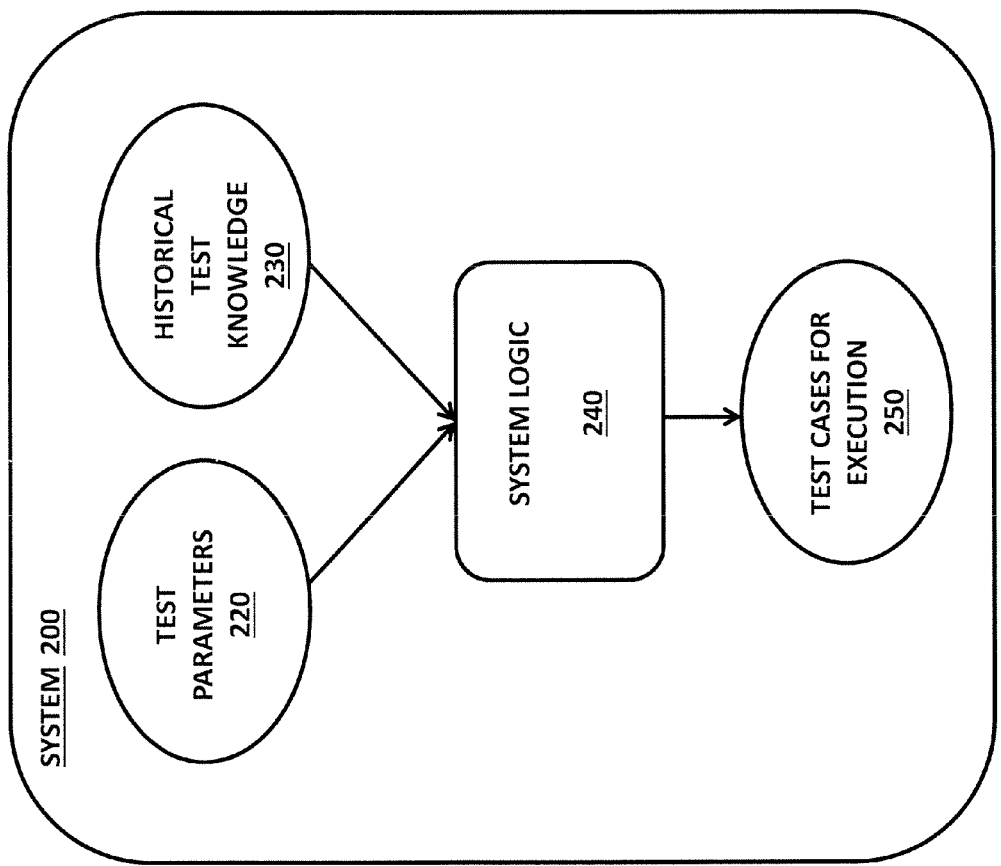
FIG. 2 is a diagrammatic representation of an exemplary system for optimizing testing efforts in system of systems testing described herein.

Exemplary Method for Optimizing Testing Efforts in System of Systems Testing FIG. 1 is a flowchart of an exemplary method 100 of implementing the optimization of testing efforts in system of systems testing described herein and can be implemented for example in a system such as shown in FIG. 2. The technologies described herein can be generic to the specifics of operating systems or hardware and can be applied in any variety of environments to take advantage of the described features.

At 110, application parameters for a new constituent system are received. Such application parameters can be provided by a user or another software tool.

At 120, historical test knowledge related to the system of systems is retrieved from the operational databases based on the received application parameters. The historical test knowledge comprises labelling and recording the interactions between the system of systems and each of the constituent systems. This is a process of extracting data from the databases, transforming them to maintain data consistency and loading into structured repository for further uses.

At 130, unique parameters from the received test parameters are characterized based on the retrieved historical test knowledge. This step characterizes the received test parameters in two categories as sharable test parameters and unique test parameters.

At 140, the characterized unique test parameters are processed to identify executable test parameters by combining in sequence or in parallel. The process of combining the unique test parameters in sequence validates the sequentially dependent activities to be performed by different constituent systems for serving specific functionality. The process of combining the unique test parameters in parallel validates the parallel activities to be performed by different constituent systems for serving specific functionality.

At 150, one or more test cases corresponding to the identified executable test parameters are selected for execution. The historical test knowledge can be updated with the identified executable test parameters for future use. These test cases are finally executed thereby optimizing the required testing efforts and overcoming repetitions that might occur.

The method 100 and any of the methods described herein can be performed by computer-executable instructions stored in one or more computer-readable media (storage or other tangible media) or stored in one or more compute readable storage devices.

Example 3

Exemplary System for Optimizing Testing Efforts in System of Systems Testing FIG. 2 is a block diagram of an exemplary system 200 implementing optimization of testing efforts in system of systems testing described herein. In the example, one or more computers in a computing environment implement system 210 that accepts as input test parameters related to new constituent system 220 and historical test knowledge 230. The system 210 includes system logic 240, which processes test parameters 220 and historical test knowledge 230 to provide test cases for execution 250. The system logic 240 characterizes unique test parameters, processes them to identify executable test parameters by combining in sequence or in parallel and selecting one or more test cases corresponding to the identified executable test parameters for execution. The executable test cases can be published for visualization to the user by means of display or can be executed for completing the system of systems testing process. The visualization can be either reports or dashboards based on the user requirements.

In practice, the systems shown herein, such as system 200 can be more complicated, with additional functionality, more complex inputs, and the like.

In any of the examples herein, the inputs, outputs and selected executable test cases 250 can be stored in one or more computer-readable storage media.

Example 4

Exemplary System of Systems

Figure 3:
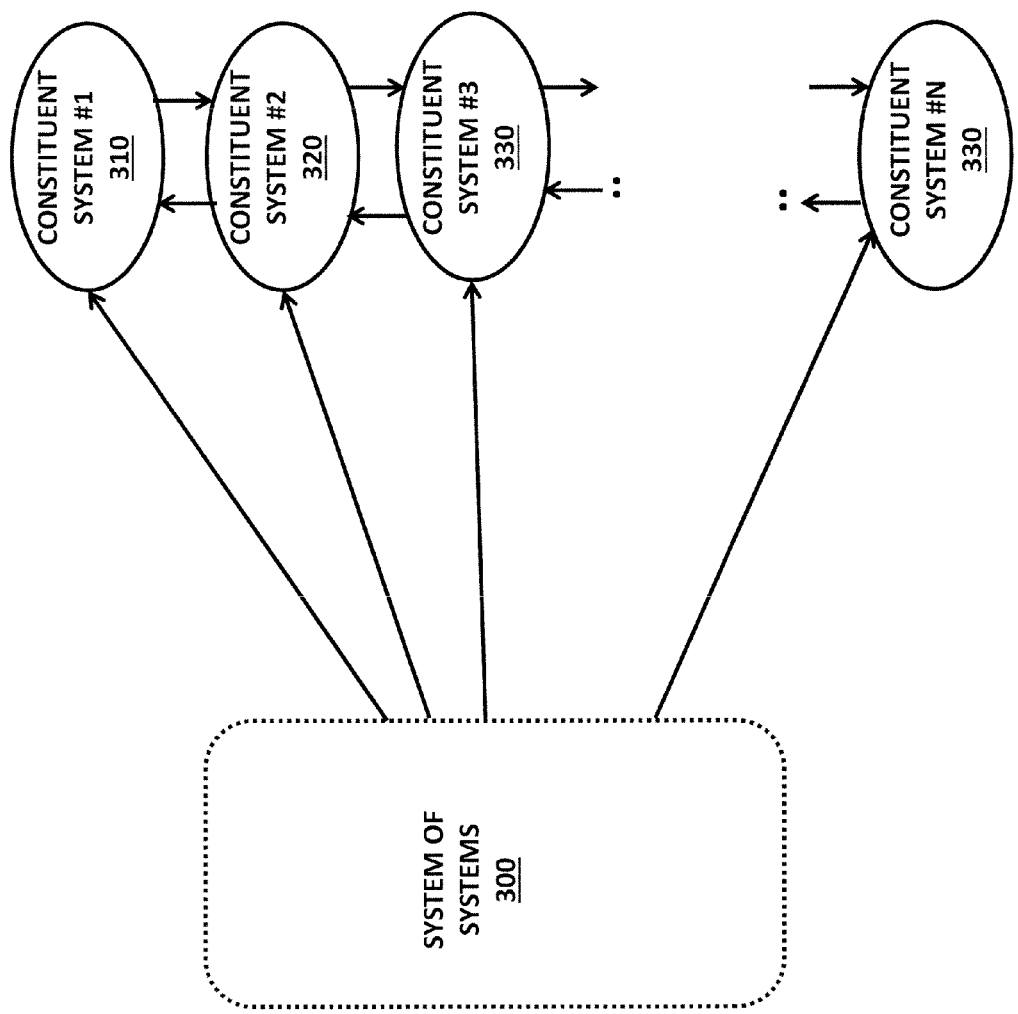
FIG. 3 is diagrammatic representation of an exemplary generic system of systems described herein.

In any of the examples herein, FIG. 3 provides an exemplary generic structure of a system of systems 300. A system of systems 300 is a finite group of constituent systems 310, 320, 330, . . . functioning together to provide services to the users for solving their common problem and communicate using wireless or wireline communication within or outside the system of systems. Each constituent system can provide services to its users independently but at low scale and reduced cardinality. The system of systems is further capable of being plugged in with a new constituent system. Examples of application include and not limited to enterprise patient information system etc. Typically, clients interact with the enterprise patient information system through a centralized portal which then operate on the interactions between different constituent systems to gather the consolidated information and finally serves the same to the client.

Example 5

Exemplary Historical Test Knowledge

In any of the examples herein, a historical test knowledge can be labelling and recording the interactions between the system of systems and each of the constituent systems. The historical knowledge can also include recoding the knowledge of positive tests in terms of service level functionalities for each of the constituent systems. The recording involves storing combined test parameters including both sharable and unique test parameters for constituent systems already plugged-in and the new constituent system being plugged-in.

Example 6

Exemplary Sharable Test Parameters

In any of the examples herein, a sharable parameter can be those whose scope of use is more than one constituent system or a constituent system and the system of systems.

For example, in a system wherein a user name to be input must consist of a minimum number of characters and maximum number of characters. This user name is a sharable parameter along with minimum and maximum number of characters permissible by that system. These parameters could be common to many of the constituent systems.

Example 7

Exemplary Unique Test Parameters

In any of the examples herein, a unique parameter can be those whose scope of use is independent over a constituent system which essentially varies from system to system.

For example, a password to be input for the constituent system by the user to login successful to get the access to it should consist of one or more special characters in it. This might not be the case with other constituent systems.

Example 8

Exemplary General Process

The general process for optimizing the testing efforts in system of systems is the use of historical test knowledge and characterization of test parameters for reducing the testing efforts and costs by selecting only the optimal test cases for execution.

The process can identify various testing needs of test analyst required in system of system testing and maintenance. The process involves receiving of testing related information from sources, characterizing that information to identify various executable test parameters and selecting one or more executable test cases from the identified executable test parameters for execution.

The system can allow choices to be able to select, and based on the selection, provide required test case for execution.

Example 9

Exemplary Computing Environment

The techniques and solutions described herein can be performed by software, hardware, or both of a computing environment, such as one or more computing devices. For example, computing devices include server computers, desktop computers, laptop computers, notebook computers, handheld devices, netbooks, tablet devices, mobile devices, PDAs, and other types of computing devices.

Figure 4:
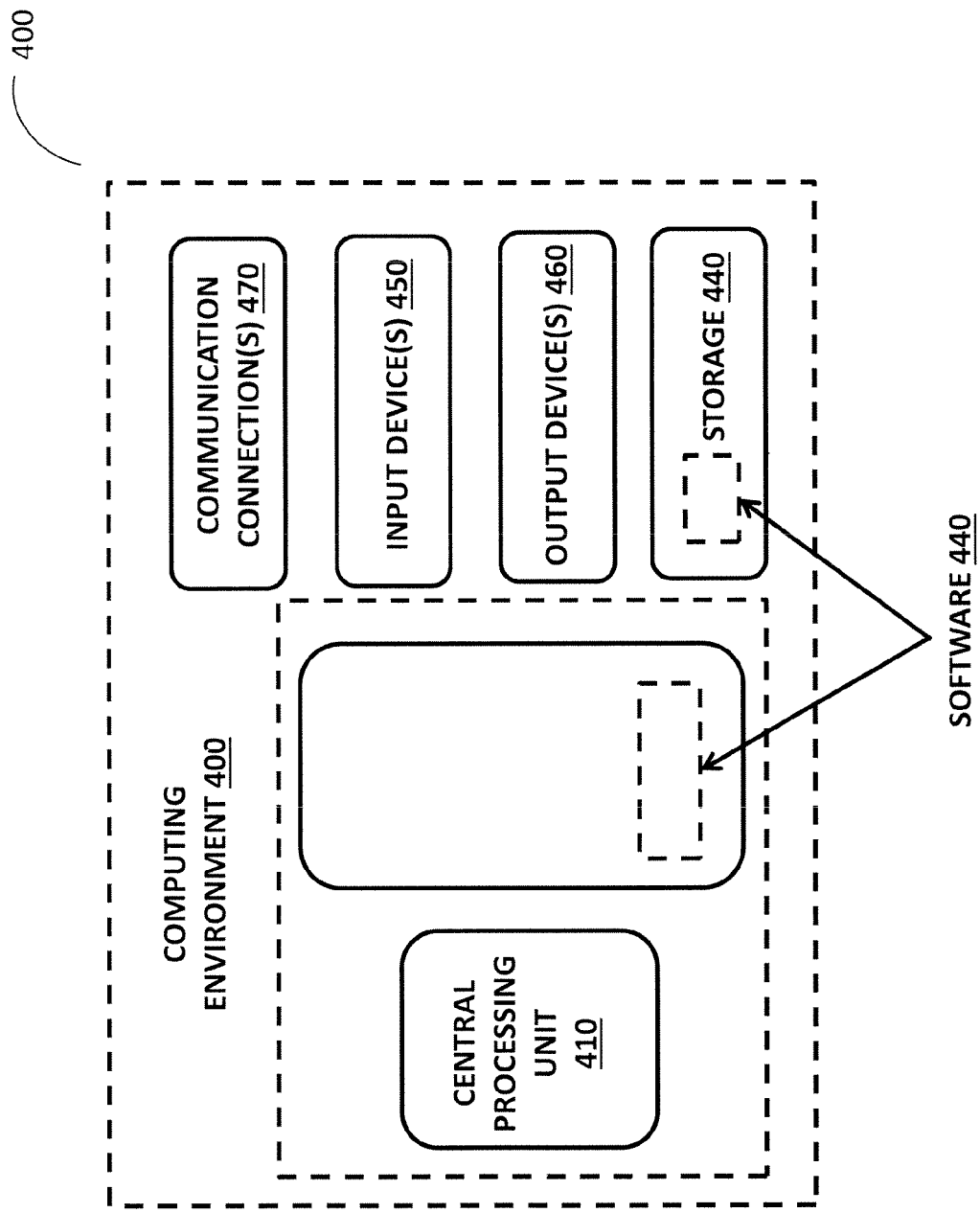
FIG. 4 is a block diagram of an exemplary computing environment suitable for implementing any of the technologies described herein.

FIG. 4 illustrates a generalized example of a suitable computing environment 400 in which the described technologies can be implemented. The computing environment 400 is not intended to suggest any limitation as to scope of use or functionality, as the technologies may be implemented in diverse general-purpose or special-purpose computing environments. For example, the disclosed technology may be implemented using a computing device comprising a processing unit, memory, and storage storing computer-executable instructions implementing the enterprise computing platform technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices With reference to FIG. 4, the computing environment 400 includes at least one processing unit 410 coupled to memory 420. In FIG. 8, this basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. The memory 420 can store software 480 implementing any of the technologies described herein.

A computing environment may have additional features. For example, the computing environment 400 includes storage 440, one or more input devices 450, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other computer-readable media which can be used to store information and which can be accessed within the computing environment 400. The storage 440 can store software 480 containing instructions for any of the technologies described herein.

The input device(s) 450 may be a touch input device such as a keyboard, mouse, pen, or trackball, a voice input device, a scanning device, or another device that provides input to the computing environment 400. For audio, the input device(s) 450 may be a sound card or similar device that accepts audio input in analog or digital form, or a CD-ROM reader that provides audio samples to the computing environment. The output device(s) 460 may be a display, printer, speaker, CD-writer, or another device that provides output from the computing environment 400.

The communication connection(s) 470 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more non-transitory computer-readable media. Such instructions can cause a computer to perform the method. The technologies described herein can be implemented in a variety of programming languages.

Methods in Computer-Readable Storage Devices

Any of the methods described herein can be implemented by computer-executable instructions stored in one or more non-transitory computer-readable storage devices. Such instructions can cause a computer to perform the method.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A non-transitory computer readable medium having stored thereon instructions for optimizing testing efforts in testing a system of systems comprising machine executable code which when executed by at least one host processor, causes the host processor to perform steps to and that comprise:
   receive one or more test parameters for a new constituent system in the system of systems;
   retrieve historical test knowledge based on the received test parameters for the new constituent system;
   characterize unique test parameters from the received test parameters based on the retrieved historical test knowledge;
   process the unique test parameters to identify executable test parameters by combining in sequence or in parallel; and
   select one or more test cases corresponding to the identified executable test parameters for execution.

2. The medium of claim 1, further comprises execute the selected test cases.

3. The medium of claim 1, wherein the historical test knowledge comprises labeling interactions between the system of systems and the new constituent system and recording them.

4. The medium of claim 1, wherein the historical test knowledge further comprises record knowledge of positive tests of service level functionalities for the new constituent system.

5. The medium of claim 1, wherein the retrieve the historic test knowledge comprises initiate a probe to receive historic test knowledge from at least one knowledge source.

6. The medium of claim 1, wherein, the received test parameters are characterized into sharable test parameters and unique test parameters.

7. The medium of claim 1, wherein the combining the unique test parameters in sequence validates sequentially dependent activities to be performed by different constituent systems for serving specific functionality.

8. The medium of claim 1, wherein the combining the unique test parameters in parallel validates parallel activities to be performed by different constituent systems for serving specific functionality.

9. The medium of claim 1, further comprises update the historical test knowledge with the identified executable test parameters for future use.

10. The medium of claim 1, further comprises providing an interactive user interface for displaying and receiving information and prompting data entry.

11. A computer system for optimizing testing efforts in testing a system of systems comprising:
   a processor; and
   a memory coupled to the processor configured to execute programmed instructions stored in the memory to and that comprise:
      receive one or more test parameters for a new constituent system in the system of systems;
      retrieve historical test knowledge based on the received test parameters for the new constituent system;
      characterize unique test parameters from the received test parameters based on the retrieved historical test knowledge;
      process the unique test parameters to identify executable test parameters by combining in sequence or in parallel; and
      select one or more test cases corresponding to the identified executable test parameters for execution.

12. The system of claim 11, wherein the programmed instructions stored in the memory further comprise adapt to execute the selected test cases.

13. The system of claim 11, wherein, the system of systems comprises finite group of constituent systems functioning together to provide services and communicate using wireline or wireless communication within or outside the system of systems.

14. The system of claim 11, wherein, the historic test knowledge is retrieved from one or more data sources.

15. The system of claim 11 wherein the programmed instructions stored in the memory further comprise provide an interactive user interface for displaying and receiving information and prompting data entry.

16. A method for optimizing testing efforts in testing a system of systems, the method comprising:
   receiving, by a computing device, one or more test parameters for a new constituent system in the system of systems;
   retrieving, by the computing device, historical test knowledge based on the received test parameters for the new constituent system;
   characterizing, by the computing device, unique test parameters from the received test parameters based on the retrieved historical test knowledge;
   processing, by the computing device, the unique test parameters to identify executable test parameters by combining in sequence or in parallel; and
   selecting, by the computing device, one or more test cases corresponding to the identified executable test parameters for execution.

17. The method of claim 16, further comprising adapting, by the computing device, to execute the selected test cases.

18. The method of claim 16, wherein the system of systems comprises finite group of constituent systems functioning together to provide services and communicate using wireline or wireless communication within or outside the system of systems.

19. The method of claim 16, wherein the historic test knowledge is retrieved from one or more data sources.

20. The method of claim 16 further comprising providing, by the computing device, an interactive user interface for displaying and receiving information and prompting data entry.

* * * * *